(12) United States Patent
Klosinski et al.

(10) Patent No.: US 7,484,416 B1
(45) Date of Patent: Feb. 3, 2009

(54) PROCESS CONTROL TRANSMITTER WITH VIBRATION SENSOR

(75) Inventors: Andrew J. Klosinski, Chaska, MN (US); John P. Schulte, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/872,184

(22) Filed: Oct. 15, 2007

(51) Int. Cl.
*G06F 11/00* (2006.01)
*G01L 9/12* (2006.01)

(52) U.S. Cl. .............................. 73/718; 73/724; 714/25
(58) Field of Classification Search ................ 73/718, 73/724; 714/25
See application file for complete search history.

(56) References Cited

U.S. PATENT DOCUMENTS

| | | | |
|---|---|---|---|
| 2,533,339 A | 12/1950 | Willenborg | 177/311 |
| 3,012,432 A | 12/1961 | Moore et al. | 73/40 |
| 3,218,863 A | 11/1965 | Calvert | 73/398 |
| 3,232,712 A | 2/1966 | Stearns | 23/255 |
| 3,249,833 A | 5/1966 | Vosteen | 317/246 |
| 3,374,112 A | 3/1968 | Danon | 117/226 |
| 3,557,621 A | 1/1971 | Ferran | 73/398 |
| 3,697,835 A | 10/1972 | Satori | 317/246 |
| 3,808,480 A | 4/1974 | Johnston | 317/256 |
| 3,924,219 A | 12/1975 | Braun | 338/34 |
| 4,008,619 A | 2/1977 | Alcaide et al. | 73/398 |
| 4,158,217 A | 6/1979 | Bell | 361/283 |
| 4,168,518 A | 9/1979 | Lee | 361/283 |
| 4,177,496 A | 12/1979 | Bell et al. | 361/283 |
| 4,227,419 A | 10/1980 | Park | 73/724 |
| 4,287,553 A | 9/1981 | Braunlich | 361/283 |
| 4,322,775 A | 3/1982 | Delatorre | 361/283 |
| 4,336,567 A | 6/1982 | Anastasia | 361/283 |
| 4,358,814 A | 11/1982 | Lee et al. | 361/283 |
| 4,370,890 A | 2/1983 | Frick | 73/718 |
| 4,389,895 A | 6/1983 | Rud, Jr. | 73/724 |

(Continued)

FOREIGN PATENT DOCUMENTS

DE 3340834 A1 5/1985

(Continued)

OTHER PUBLICATIONS

U.S. Appl. No. 11/834,221, filed Aug. 6, 2007.

*Primary Examiner*—Andre J Allen
(74) *Attorney, Agent, or Firm*—Westman, Champlin & Kelly, P.A.

(57) ABSTRACT

A transmitter for use in an industrial process control system, includes a process coupling configured to couple to a process fluid. A sensor housing has a cavity formed therein which is in fluidic communication with the process fluid. A diaphragm in the cavity isolates a portion of the cavity from the process fluid and moves in response to pressure applied by the process fluid. A first electrode in the isolated portion of the cavity is configured to form a first capacitance with the diaphragm and a second electrode in the isolated portion of the cavity configured to form a second capacitance with the diaphragm. Measurement circuitry coupled to the first and second capacitance measures a pressure of the process fluid based upon at least one of the first capacitance and second capacitance. The measurement circuitry further configured to measure vibrations in the process fluid based upon at least one of the first capacitance and second capacitance.

23 Claims, 4 Drawing Sheets

U.S. PATENT DOCUMENTS

| | | | | |
|---|---|---|---|---|
| 4,422,125 A | | 12/1983 | Antonazzi et al. | 361/283 |
| 4,422,335 A | | 12/1983 | Ohnesorge et al. | 73/724 |
| 4,434,451 A | | 2/1984 | Delatorre | 361/283 |
| 4,455,874 A | | 6/1984 | Paros | 73/704 |
| 4,458,537 A | | 7/1984 | Bell et al. | 73/718 |
| 4,490,773 A | | 12/1984 | Moffatt | 361/283 |
| 4,542,436 A | | 9/1985 | Carusillo | 361/283 |
| 4,562,742 A | | 1/1986 | Bell | 73/718 |
| 4,670,733 A | | 6/1987 | Bell | 338/36 |
| 4,785,669 A | | 11/1988 | Benson et al. | 73/718 |
| 4,860,232 A | | 8/1989 | Lee et al. | 364/571.04 |
| 4,875,369 A | | 10/1989 | Delatorre | 73/151 |
| 4,878,012 A | | 10/1989 | Schulte et al. | 324/60 |
| 4,926,674 A | | 5/1990 | Fossum et al. | 73/4 |
| 4,951,174 A | | 8/1990 | Grantham et al. | 361/283.1 |
| 4,977,480 A | | 12/1990 | Nishihara | 73/724 |
| 5,051,743 A | * | 9/1991 | Orszulak | 340/870.04 |
| 5,094,109 A | | 3/1992 | Dean et al. | 73/718 |
| 5,168,419 A | | 12/1992 | Delatorre | 361/283 |
| 5,194,819 A | | 3/1993 | Briefer | 73/718 |
| 5,230,250 A | | 7/1993 | Delatorre | 73/733 |
| 5,233,875 A | | 8/1993 | Obermeier et al. | 73/718 |
| 5,329,818 A | | 7/1994 | Frick et al. | 73/708 |
| 5,471,884 A | * | 12/1995 | Czarnocki et al. | 73/720 |
| 5,492,016 A | | 2/1996 | Pinto et al. | 73/724 |
| 5,542,300 A | | 8/1996 | Lee | 73/724 |
| 5,637,802 A | | 6/1997 | Frick et al. | 73/724 |
| 5,642,301 A | | 6/1997 | Warrior et al. | 364/571.02 |
| 5,705,978 A | | 1/1998 | Frick et al. | 340/511 |
| 5,731,522 A | | 3/1998 | Sittler | 73/708 |
| 5,757,608 A | | 5/1998 | Bernot et al. | 361/283.4 |
| 5,854,994 A | | 12/1998 | Canada et al. | 702/56 |
| 5,911,162 A | | 6/1999 | Denner | 73/718 |
| 5,912,499 A | * | 6/1999 | Diem et al. | 257/419 |
| 5,992,240 A | | 11/1999 | Tsuruoka et al. | 73/718 |
| 5,995,910 A | | 11/1999 | Discenzo | 702/56 |
| 6,236,096 B1 | | 5/2001 | Chang et al. | 257/419 |
| 6,260,004 B1 | | 7/2001 | Hays et al. | 702/183 |
| 6,295,875 B1 | | 10/2001 | Frick et al. | 73/718 |
| 6,601,005 B1 | | 7/2003 | Eryurek et al. | 702/104 |
| 6,904,476 B2 | | 6/2005 | Hedtke | 710/72 |
| 7,099,852 B2 | | 8/2006 | Unsworth et al. | 706/23 |
| 2005/0072239 A1 | | 4/2005 | Longsdorf et al. | 73/649 |
| 2006/0212139 A1 | | 9/2006 | Hedtke et al. | 700/28 |

FOREIGN PATENT DOCUMENTS

| | | |
|---|---|---|
| EP | 0 524 550 A1 | 1/1993 |
| WO | WO 99/53286 | 10/1999 |

* cited by examiner

PROCESS CONTROL TRANSMITTER WITH VIBRATION SENSOR

BACKGROUND OF THE INVENTION

The present invention relates to diagnostics of equipment used with industrial processes. More specifically, the invention relates the use of vibrations to perform diagnostics.

Process devices are used in industrial process control systems to control, measure or monitor a process. A control device is a process device which is used to control the process and includes pumps, valves, actuators, solenoids, motors, mixers, agitators, breaker, crusher, roller, mill, ball mill, kneader, blender, filter, cyclone, centrifuge, tower, dryer, conveyor, separator, elevator, hoist, heater, cooler or others. A valve controller includes a valve actuator coupled to a valve used to control flow of process fluid. A pump controller includes a motor controller or actuator coupled to a pump. Other process devices include transmitters which may measure physical parameters such as pressure, temperature, flow, etc. Diagnostics of process devices can be used to identify a failed process device or predict an impending failure in the device or another process component.

Vibration of process equipment such as process piping is disruptive to industrial processes and can result in damage to the piping, instrumentation, and other components of the industrial plant. For example, during normal operation of the process, vibration arises through various sources. The vibration is transmitted to the components which are used in the process. Over extended time, these vibrations can cause degradation in the performance of the components and eventual failure of the components.

Sensing vibrations is a known method used to diagnose process devices. A vibration sensor such as an accelerometer placed directly on a process device can be used to sense vibration noise signals generated by the device. Vibrations are isolated and evaluated by identifying those which exceed an amplitude threshold or which have an abnormal frequency which are indicative of an actual or impending failure or reduction of performance. For example, sensors are placed on pump or motor housings, discharge valves, or flanges associated with the process device. Another known diagnostic method is a manual inspection in which an operator listens for abnormal sounds from the control device.

Detecting harmful vibrations can allow damaged process equipment to be replaced prior to its ultimate failure. Similarly, the vibrations can be used to detect aberrations in operation of equipment or to compensate for degradation in components of the equipment. There is an ongoing need for improved diagnostic technology in industrial process control and monitoring for detecting failed components and components which have been degraded or are in the process of failing. One such technique is shown in U.S. Pat. No. 6,601,005, issued Jul. 29, 2003, and entitled PROCESS DEVICE DIAGNOSTICS USING PROCESS VARIABLE SENSOR SIGNAL which is incorporated herein by reference.

SUMMARY OF THE INVENTION

A transmitter for use in an industrial process control system, includes a process coupling configured to couple to a process fluid. A sensor housing has a cavity formed therein which is in fluidic communication with the process fluid through the process coupling. A diaphragm in the cavity is configured to isolate a portion of the cavity from the process fluid and to move in response to pressure applied by the process fluid. A first electrode in the isolated portion of the cavity is configured to form a first capacitance with the diaphragm. A second electrode in the isolated portion of the cavity is configured to form a second capacitance with the diaphragm. Measurement circuitry measures a line pressure of the process fluid based upon at least one of the first capacitance and second capacitance. The measurement circuitry also measures vibrations in the process fluid based upon at least one of the first capacitance and second capacitance.

DETAILED DESCRIPTION OF THE PREFERRED EMBODIMENTS

The present invention provides a technique for measuring a process line pressure and measuring vibrations in a process fluid using a single sensor. The sensor includes a diaphragm which can, in some configurations, be in direct contact with process fluid. The diaphragm deflects and responds to pressure applied by the process fluid causing a space in the cavity behind the diaphragm to change. This change can be measured using a change in electrical capacitance between the diaphragm and a wall of the cavity. This is used to determine line pressure and frequency of any vibration signals in the process fluid.

The present invention provides a diagnostic technique for detecting a failure or predicting a failure or reduction in performance of a process device or a process component prior to the occurrence of the failure or reduced performance. With the present invention, vibrations in the process and/or process device are monitored. Vibrations are detected and used to predict a failure, an impending failure, or reduced performance of the process device or process component.

Figure 1:
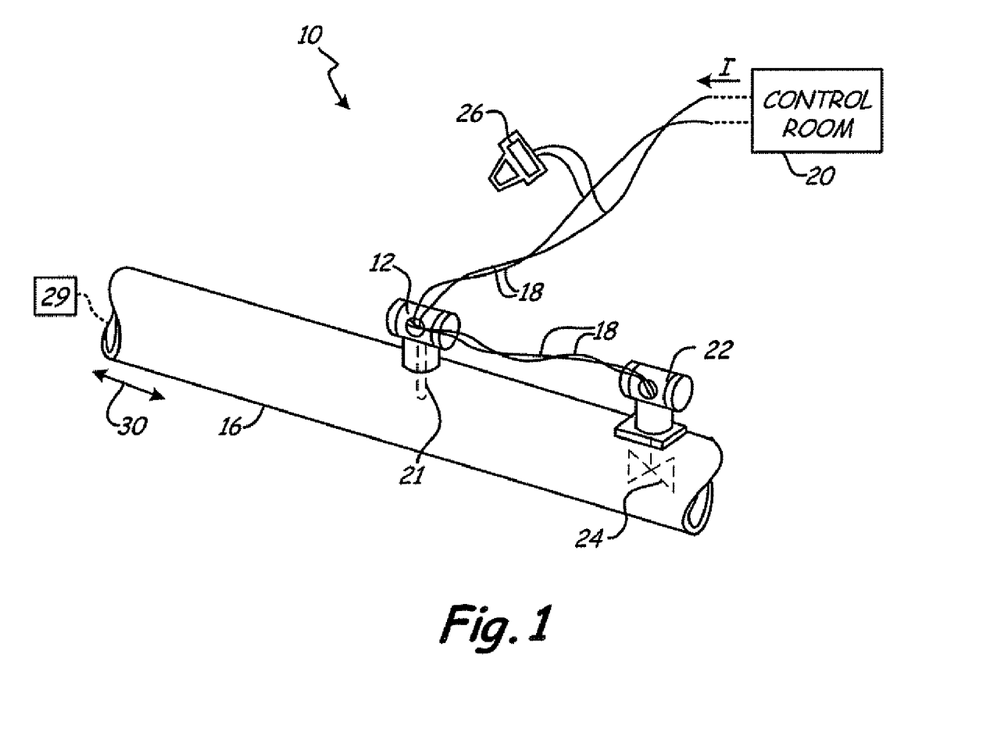
FIG. 1 is a simplified diagram of an industrial process system.

FIG. 1 is a diagram of process control system 10 which includes a transmitter 12 connected to process pipe 16. As discussed below, transmitter 12 is one type of process device and the present invention is applicable to any process device. Transmitter 12 is coupled to a two-wire process control loop 18 which operates in accordance with the Fieldbus, Profibus or HART® standard. However, the invention is not limited to these standards or a two-wire configuration. For instance, the transmitter may also operate according to various wireless standards. Two-wire process control loop 18 runs between transmitter 12 and the control room 20. In an embodiment in which loop 18 operates in accordance with the HART® protocol loop 18 can carry a current I which is representative of a sensed process variable. Additionally, the HART® protocol allows a digital signal to be superimposed on the current through loop 18 such that digital information can be sent to or received from transmitter 12. When operating in accordance with the Fieldbus standard, loop 18 carries a digital signal and can be coupled to multiple field devices such as other transmitters.

The present invention is applicable to any process device which is used in a process control environment. In general, process devices, such as transmitter 12 shown in FIG. 1 are used to measure, monitor or control process variables.

Process variables are typically the primary variables which are being controlled in a process. As used herein, process variable means any variable which describes the condition of the process such as, for example, pressure, flow, temperature, product level, pH, turbidity, vibration, position, motor current, any other characteristic of the process, etc. Control signal means any signal (other than a process variable) which is used to control the process. For example, control signal means a desired process variable value (i.e. a setpoint) such as a desired temperature, pressure, flow, product level, pH or turbidity, etc., which is adjusted by a controller or used to control the process. Additionally, a control signal means, calibration values, alarms, alarm conditions, the signal which is provided to a control element such as a valve position, signal which is provided to a valve actuator, an energy level which is provided to a heating element, a solenoid on/off signal, etc., or any other signal which relates to control of the process. A diagnostic signal as used herein includes information related to operation of devices and elements in the process control loop, but does not include process variables or control signals. For example, diagnostic signals include valve stem position, applied torque or force, actuator pressure, pressure of a pressurized gas used to actuate a valve, electrical voltage, current, power, resistance, capacitance, inductance, device temperature, stiction, friction, full on and off positions, travel, frequency, amplitude, spectrum and spectral components, stiffness, electric or magnetic field strength, duration, intensity, motion, electric motor back EMF, motor current, loop related parameters (such as control loop resistance, voltage, or current), or any other parameter which may be detected or measured in the system. Furthermore, process signal means any signal which is related to the process or element in the process such as, for example, a process variable, a control signal or a diagnostic signal. Process devices include any device which forms part of or couples to a process control loop and is used in the control or monitoring of a process.

As discussed above, FIG. 1 is a diagram showing an example of a process control system 10 which includes process piping 16 which carries a process fluid and two wire process control loop 18 carrying loop current I. A transmitter 12, controller 22, which couples to a final control element in the loop such as an actuator, valve, a pump, motor or solenoid, communicator 26, and control room 20 are all coupled to process control loop 18. It is understood that loop 18 is shown in one configuration and any appropriate process control loop may be used such as a 4-20 mA loop, 2, 3 or 4 wire loop, multi-drop loop and a loop operating in accordance with the HART®, Fieldbus or other digital or analog communication protocol. In operation, transmitter 12 senses a process variable such as flow using sensor 21 and transmits the sensed process variable over loop 18. The process variable may be received by controller/valve actuator 22, communicator 26 and/or control room equipment 20. Controller 22 is shown coupled to valve 24 and is capable of controlling the process by adjusting valve 24 thereby changing the flow in pipe 16. Controller 22 receives a control input over loop 18 from, for example, control room 20, transmitter 12 or communicator 26 and responsively adjusts valve 24. In another embodiment, controller 22 internally generates the control signal based upon process signals received over loop 18. Communicator 26 may be the portable communicator shown in FIG. 1 or may be a permanently mounted process unit which monitors the process and performs computations. Process devices include, for example, transmitter 12 (such as a 3051S transmitter available from Rosemount Inc. of Chanhassen, Minn.), controller 22, communicator 26 and control room 20 shown in FIG. 1. Another type of process device is a PC, programmable logic unit (PLC) or other computer coupled to the loop using appropriate I/O circuitry to allow monitoring, managing, and/or transmitting on the loop.

Any of the process devices 12, 20, 22 or 26 shown in FIG. 1 may include a vibration measurement sensor in accordance with the present invention. However, such a sensor is typically implemented in transmitter 12.

Any of the process devices shown in FIG. 1 which physically couples to the industrial process, for example, to process piping 16, can include a sensor to sense vibration in accordance with the invention. During process operation, vibrations occur and are transmitted to process components. A generic process component 29 is illustrated in FIG. 1 and can comprise any physical item which receives or generates vibrations from operation of the process. Component 29 can comprise components within the process device which perform the diagnostics. The vibrations can be from various sources such as motors, cavitation or fluid movement, actuators, etc. The vibrations are physically carried along the process components which are illustrated by arrow 30. These vibrations can cause the degradation and ultimate failure of process component 29. Process component 29 can be any component which is coupled to industrial process 10. Example process components include process piping, valves, pumps, sensors, transmitters, electrical equipment, mechanical equipment, control elements, conduits, tanks, actuators, agitators, or other components or devices.

In accordance with one embodiment of the present invention, a process device, such as transmitter 12 includes a vibration sensor configured to sense vibrations occurring in the industrial process. Diagnostic circuitry in transmitter 12, or at a remote location can monitor the sensed vibrations and can be used to diagnose a failure or an impending failure, or degradation of performance of process component 29. The component 29 can, in some embodiments, comprise a component of the process device which performs the diagnostics. In other embodiments, the component 29 is physically separated from the device which performs the diagnostics. An output can be provided by transmitter 12, for example to control room 20 over two-wire process control loop 18, which provides an indication of the failure or impending failure of process component 29. Using this information, an operator can repair or replace a failed component 29, or repair or replace a component 29 prior to its ultimate failure. This allows any maintenance of the process 10 to occur at a scheduled time. This can be particularly advantageous if the repair or replacement of the component 29 requires the process 10 to be shut down. Further, some components can fail either catastrophically or in a manner which causes other components to be damaged, or cause the release of unsafe product to the environment. By providing an indication that the component 29 may fail in the near future, or predicting a time of ultimate failure, the component 29 can be repaired or replaced prior to that ultimate failure.

Figure 2:
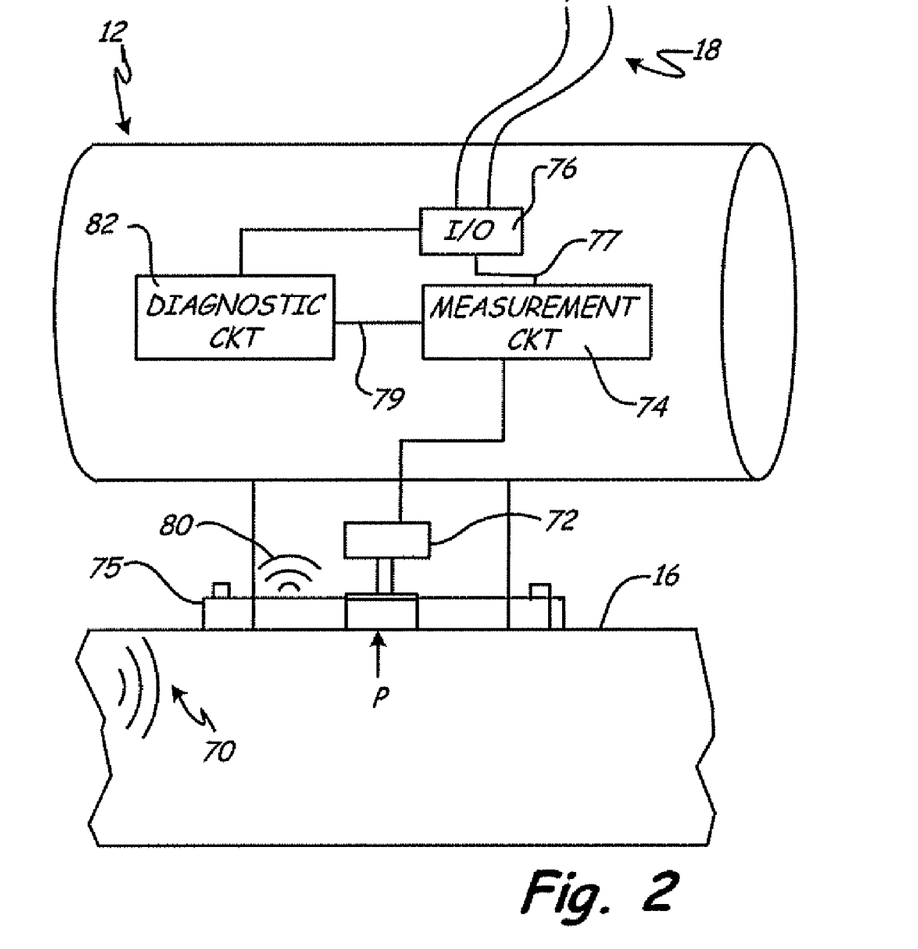
FIG. 2 is a perspective view of a process transmitter including a vibration sensor in accordance with the present invention.

FIG. 2 is a diagram showing process transmitter 12 coupled to process piping 16 through process coupling 75. Vibrations 70 are shown traveling through the industrial process. For example, the vibration 70 may be carried by process piping 16, process fluid within piping 16, or other physical couplings to transmitter 12. The process coupling 75 can be any type of coupling such as a flange, piping, etc. Examples of other types of process couplings are shown in co-pending application Ser. No. 11/364,877, filed Feb. 28, 2006, titled PROCESS CONNECTION FOR PROCESS DIAGNOSTICS by inventors Robert C. Hedtke and David A. Broden, commonly assigned with the present application which is incorporated herein in its entirety.

Transmitter 12 includes a pressure sensor 72 in accordance with the present invention. Sensor 72 is configured to measure a pressure P from the process fluid which may be a line or gauge pressure. Sensor 72 couples to measurement circuitry 74 which provides a process variable signal 77 to I/O circuitry 76 and a vibration signal 79 to diagnostic circuitry 82. I/O circuitry 76 is configured to transmit information related to the sensed process variable over process control loop 18. In some embodiments, I/O circuitry 76 can also receive power through process control loop 13 which is used to completely power the circuitry and components of transmitter 12.

The sensor 72 is further configured to sense vibrations 80 and provide a vibration sensor signal 79 to diagnostic circuitry 82. Signal 79 can be provided directly to circuitry 82 or as illustrated in FIG. 2, can be provided through measurement circuitry 74 sensed by and provides an output via I/O circuitry 76 which provides an indication of a failure or impending failure of a process component 29.

The vibrations 70 in process piping 16 and process equipment are disruptive to the industrial process 10 and can result in damage to the process piping 16, instrumentation, and other plant components. Process transmitter 12 provides a built-in capability for monitoring the vibrations and detecting and predicting potential damage. By detecting harmful vibrations, transmitter 12 can prevent the need to replace damaged process instruments or other equipment. Plant integrity and safety can also be maintained by preventing process leakage due to broken piping or damage to other equipment that provides containment of the process.

In some embodiments, the vibration diagnostics of the present invention can avoid or reduce plant downtime by predicting the impending loss of a measurement instrument or a control instrument while there is still time to replace or repair the device. Vibration information can also be provided to other devices. Data compression algorithms can be used for such transmissions. A diagnostic indication can be provided on two-wire process control loop 18. For example, a HART® status or other alert can be transmitted over loop 18. Such an alert can be provided to the control room 20 when the sensed vibration exceeds a predefined threshold amplitude. The vibration diagnostic alert can be triggered if the instantaneous vibration exceeds a threshold level or, for example, if the cumulative vibration have exceeded a threshold. The accumulation can be over the sensor lifetime, partial lifetime (windowed) r or an accumulation of peaks or other vibration signatures. Trends or specific vibration signatures in the vibrations can also be used for diagnostics. Because the vibration diagnostics of the present invention can be integrated with a process device, additional diagnostic devices are not required. The configuration of the vibration based diagnostics can be easily integrated with existing process information systems used in the industrial processes.

Although the I/O circuitry 76, measurement circuitry 74 and diagnostic circuitry 82 are shown as separate components in FIG. 2, these circuit blocks can be implemented in shared circuitry and/or software. For example, many of these functions can be implemented in a digital processor. In addition to comparing sensed vibrations, or cumulative sensed vibrations, to a fixed threshold, other diagnostic techniques can be employed by diagnostic circuitry 82. For example, an expert system can be implemented using if/then rules. Diagnostics can be based upon the frequency spectrum of sensed vibrations. Complex processing can be employed such as neural networks, fuzzy logic, etc.

Figure 3:
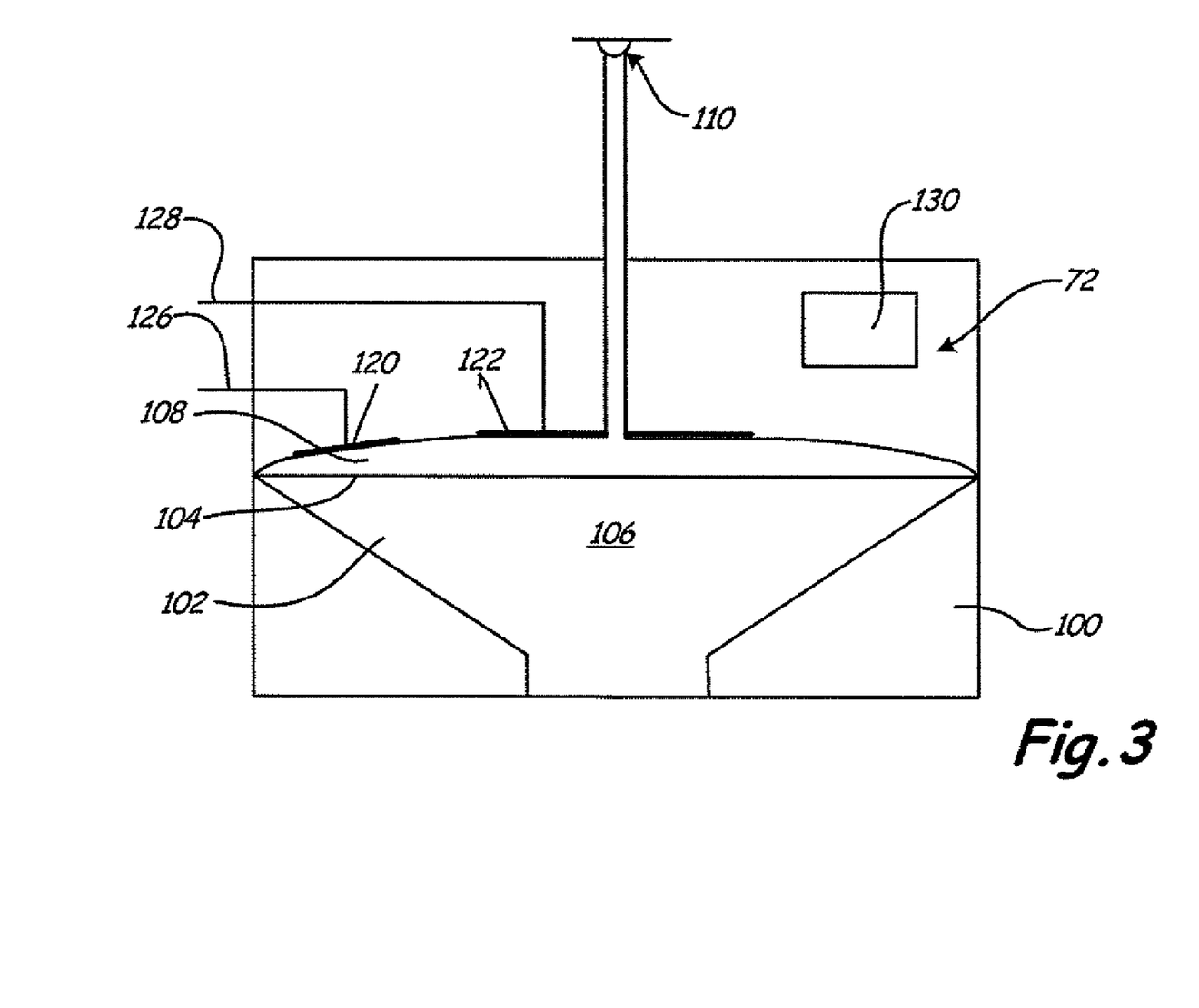
FIG. 3 is a cross-sectional view of the vibration sensor of FIG. 2.

FIG. 3 is a side cross-sectional view of pressure sensor 72 in accordance with one example of embodiment of the present invention. Pressure sensor 72 includes a pressure sensor body 100 having a cavity 102 formed therein. A flexible diaphragm 104 spans the cavity 102 and divides the cavity into a first cavity portion 106 and second cavity portion 108. Cavity portion 106 is, in some configurations, exposed to process fluid or otherwise receives a pressure which is related to a pressure of the process fluid. This connection is through the process coupling 75 shown in FIG. 2. Cavity portion 108 is filled with an isolated fluid through a fill connection 110. An outer electrode 120 and an inner electrode 122 are positioned on a wall of cavity portion 108. Electrode 120 forms an outer electrical capacitor between the electrode 120 and diaphragm 104. Similarly, inner electrode 122 forms an inner electrical capacitor between electrode 122 and diaphragm 104. Electrical connections 126 and 128 couple electrodes 120 and 122, respectively, to measurement circuitry 74 which is shown in FIG. 2.

As pressure from process fluid is applied to the diaphragm 104, the diaphragm 104 moves with respect to electrodes 120 and 122. This causes the inner capacitance and outer capacitance to change accordingly. Pressure sensor 72 is arranged to measure a line pressure. Pressure sensor 72 operates in accordance with techniques discussed in connection with differential pressure in U.S. Pat. No. 6,295,875, entitled PROCESS PRESSURE MEASUREMENT DEVICES WITH IMPROVED ERROR COMPENSATION, issued Oct. 2, 2001, to Roger L. Frick, Stanley E. Rud, Jr., and David A. Broden; commonly assigned with the present application and incorporated herein in its entirety.

During operation, the diaphragm 104 deflects in response to line pressure. Additionally, diaphragm 104 deflects at a frequency related to a frequency of vibrations carried in the industrial process. The values of the line pressure and vibration signal can be measured by measuring the inner capacitance and the outer capacitance formed by electrodes 122 and 120, respectively. The sensor 72 can operate in accordance with any appropriate techniques. However, in one configuration, the inner electrode 122 is positioned near the center of the cavity 108 while the outer electrode 120 comprises a ring which generally encircles the cavity 108. The diaphragm 104 can comprise a pre-tensioned isolator which is welded or otherwise bonded across the cavity 102. Oil, or other fluid, can be injected into cavity portion 108 through port 110. The oil fill can be used to reduce pressure hysteresis. Port 110 can be sealed off using a crimp, weld or the like. This configuration provides for over-pressure protection by preventing the diaphragm 104 from deflecting beyond the inner wall cavity 108. The fill fluid used to fill cavity 108 can be substantially incompressible to thereby limit movement of diaphragm 104. However, the stiffness of diaphragm 104 can be selected to achieve the desired sensitivity and is also affected based upon the compressibility of the fill fluid.

The relationship between the deflection of diaphragm 104 and the applied pressure and vibration can be depended upon temperature. In such a configuration, a temperature sensor 130 can be mounted to the pressure sensor 72 and can be used to compensate the measurements. Sensor 130 can provide a temperature signal to circuitry 74 for use in temperature compensation.

Figure 4:
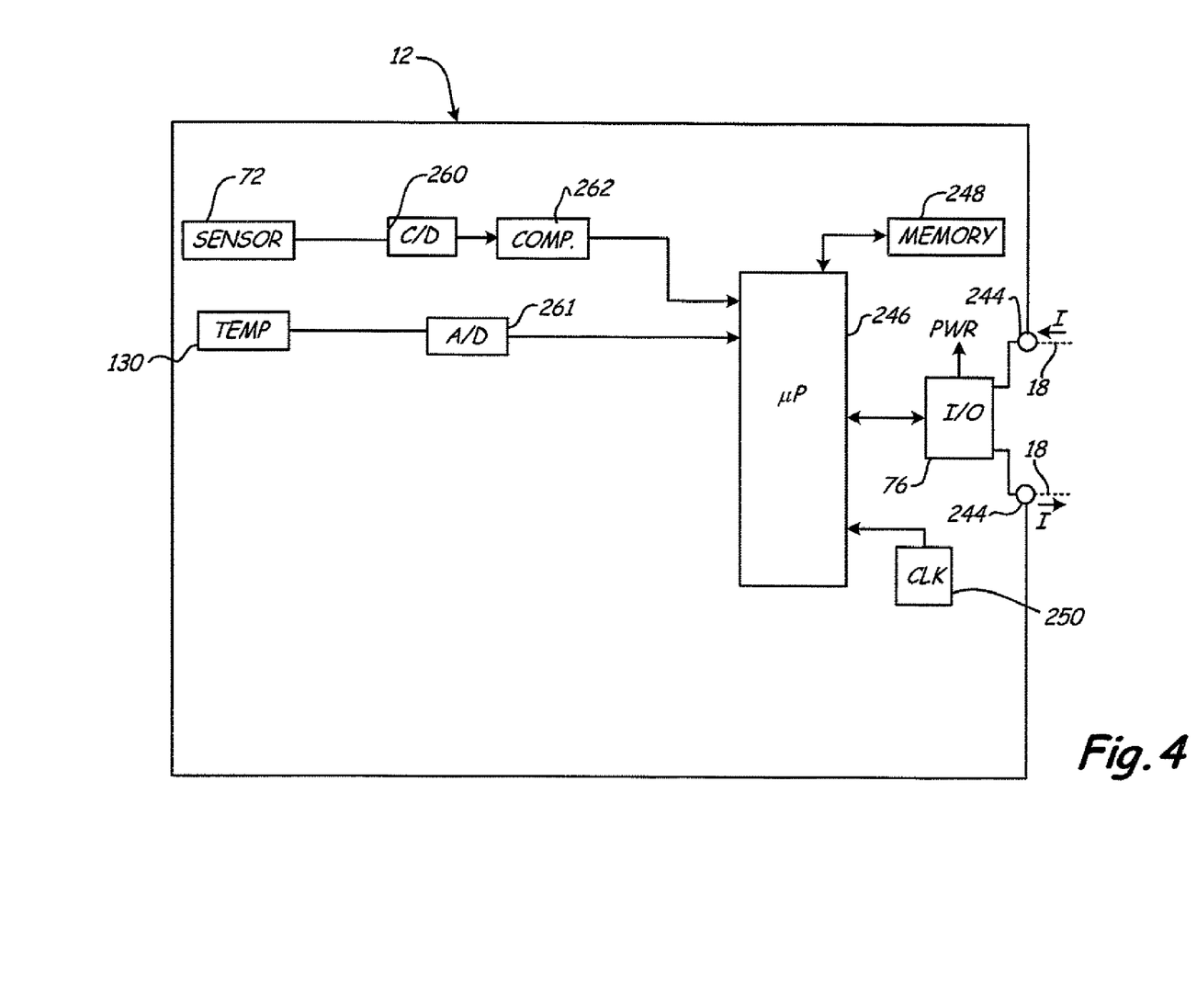
FIG. 4 is a block diagram showing circuitry of the pressure transmitter of FIG. 2.

FIG. 4 is a block diagram of transmitter 12. Transmitter 12 includes I/O circuitry 76 coupled to loop 18 at terminal 244. I/O circuitry has preselected input and output impedance known in the art to facilitate appropriate communication. Transmitter 12 includes microprocessor 246, coupled to I/O circuitry 76, memory 248 coupled to microprocessor 246 and clock 250 coupled to microprocessor 246. Sensor 72 provides a sensor output to capacitance to digital converter. Compensation circuitry 262 compensates the digitized signal and provides a digitized process variable signal to microprocessor 246. The sensor output provided by sensor 72 includes the outputs from electrode 120 and electrode 122 and the capacitance to digital converter 260 converts both signals into digital format for use by microprocessor 246. FIG. 4 also shows temperature sensor 130 which provides an output related to temperature to analog to digital converter 261. Analog to digital converter provides a digital signal related to the temperature of sensor 72 to the microprocessor 246. In one embodiment, I/O circuitry 76 provides a power output used to completely power other circuitry in transmitter 12 using power received from loop 18.

Microprocessor 246 can monitor the sensed vibrations and provide an indication of a failure or impending failure of a process component. For example, the microprocessor can compare the sensed vibration to a baseline value or a nominal value. This information can be stored in memory 248. The baseline and nominal values can change based upon the mode of operation of the process, or other factors. The baseline can be a particular frequency spectrum or signature and can be based upon observed history of process operation. Further, the diagnostics performed by microprocessor 246 can be based upon trends in the sensed vibrations. For example, an increase, either sudden or gradually over time, or periodic spikes or other anomalies in the sensed vibrations, can be an indication of a failure or an impending failure of a process component. Similarly, if the sensed vibrations suddenly spike, the microprocessor 246 can provide a diagnostic output indicating that a process component 29 may fail or has failed. These values, trends, or training profiles can also be stored in memory 248. The diagnostics can be based upon a simple comparison, or more complex mathematical techniques such as observing averages or rolling averages of measurements, fuzzy logic techniques, neural network techniques, or expert system techniques based upon a series of rules and/or threshold comparison. In various embodiments, the ability of the present invention to provide predictive diagnostics can be advantageous because it provides time for service personnel to service the process component prior to its ultimate failure.

The diagnostic output of the present invention can be used to provide an output signal, provide a visual indication to an operator or provide a communication signal for transmission to a control room or other diagnostic annunciation.

As discussed above, the diagnostics can be based upon various techniques which employ the sensed vibration. For example, the diagnostics can utilize vibration trends over a period of time. This information can be used to correlate with wear of bearings or pump components. It can also be used to provide an accumulative measure of exposure of process components to vibration and can be used to predict the process piping or mechanical connections, such as mounting hardware or brackets are subject to imminent failure. Additionally, the diagnostics circuitry can be used to correlate vibration signals with various steps or occurrences which occur during operation of the industrial process. For example, an aggressive chemical reaction may have a particular vibration signature. In some embodiments, a simple relative measure of vibration, for example trending better, trending worse or staying constant, may be sufficient if calibration or characterization of the vibration sensor is performed. An absolute measure of vibration can also be utilized to perform the diagnostics.

In various configurations, either the capacitance from electrode 120 or the capacitance from electrode 122 can be used to measure the vibration signal received from process fluid. Further, in some configurations, both electrodes are used in performing vibration measurement. Similarly, in obtaining line pressure or gauge pressure measurements, either or both electrodes 120 and 122 can be employed. In the configuration shown above, the measurements are sensitive to the dielectric constant of the fill fluid. This can introduce the variability based upon temperature of the fill fluid which can be compensated using temperature sensor 130. The sensors used in various configurations, can be galvanically isolated from circuitry of transmitter 12. In one configuration, the center electrode 122 is used to measure line or gauge pressure while the outer electrode 120 is used to measure vibration.

Although the present invention has been described with reference to preferred embodiments, workers skilled in the art will recognize that changes may be made in form and detail without departing from the spirit and scope of the invention. The process coupling can be any type of coupling which is capable of transferring vibrations to the vibration sensor. The process coupling includes couplings which directly mount the vibration sensor to the process. The vibrations can be received through a process connection, mounting arrangement, wiring system, etc. In some embodiments, the invention can be embodied in any type of process device. In one embodiment, by integrating vibration diagnostics with a process device, additional diagnostic devices are not required. The process device can perform diagnostics on itself, in other words, the component 29 (see FIG. 1) can be a component of the device which receives the vibrations and/or performs the diagnostics.

What is claimed is:

1. A transmitter for use in an industrial process control system, comprising:
   a process coupling configured to couple to a process fluid;
   a sensor housing having a cavity formed therein, the sensor housing cavity in fluidic communication with the process fluid through the process coupling;
   a diaphragm in the cavity configured to isolate a portion of the cavity from the process fluid and to move in response to pressure applied by the process fluid;
   a first electrode in the isolated portion of the cavity configured to form a first capacitance with the diaphragm;
   a second electrode in the isolated portion of the cavity configured to form a second capacitance with the diaphragm; and
   measurement circuitry coupled to the first and second capacitance configured to measure a pressure of the process fluid based upon at least one of the first capacitance and second capacitance, the measurement circuitry further configured to measure vibrations in the process fluid based upon at least one of the first capacitance and second capacitance.

2. The apparatus of claim 1 wherein the vibrations are carried through process components.

3. The apparatus of claim 1 including a diagnostic output which is related to failure of a process component.

4. The apparatus of claim 1 including a diagnostic output which is related to degradation in performance of a process component.

5. The apparatus of claim 1 including a diagnostic output which is related to an impending failure of a process component.

6. The apparatus of claim 1 including a diagnostic output which is based upon a comparison of sensed vibrations.

7. The apparatus of claim 1 including a temperature sensor coupled to the measurement circuitry and wherein the measurement circuitry compensates measurements based upon a measured temperature.

8. The apparatus of claim 7 wherein the temperature sensor is mounted to the sensor housing.

9. The apparatus of claim 1 wherein at least one of the first and electrode comprises an outer ring electrode.

10. The apparatus of claim 1 wherein at least one of the first and electrode comprises a center electrode.

11. The apparatus of claim 1 including a fill fluid in the isolated cavity.

12. The apparatus of claim 1 wherein the diaphragm is configured to contact the process fluid.

13. The apparatus of claim 1 wherein the diaphragm is fluidically isolated from process fluid.

14. The apparatus of claim 1 wherein the first and second electrodes are affixed adjacent a wall of isolated portion of the cavity.

15. A method of measuring parameters in an industrial process, comprising:
   fluidically coupling a sensor housing to a process fluid of the process, the sensor housing having a cavity formed therein;
   providing a movable diaphragm in the cavity which forms an isolated portion of the cavity which is isolated from the process fluid and which moves in response to pressure applied by the process fluid;
   sensing a change in electrical capacitance between the diaphragm and a first electrode;
   sensing a change in electrical capacitance between the diaphragm and a second electrode;
   determining a pressure based upon a change in sensed capacitance; and
   sensing vibrations in the process fluid based upon changes in electrical capacitance.

16. The method of claim 15 including communicating on a two-wire process control loop.

17. The method of claim 15 wherein the vibrations are carried through process components.

18. The method of claim 15 including providing a diagnostic output related to failure of a process component.

19. The method of claim 15 including providing a diagnostic output related to degradation in performance of a process component.

20. The method of claim 15 including providing a diagnostic output related to an impending failure of a process component.

21. The method of claim 15 including providing a diagnostic output based upon a comparison of sensed vibrations.

22. The method of claim 15 including compensating measurements based upon a measured temperature.

23. The method of claim 15 including placing a fill fluid in the cavity.

* * * * *